(12) United States Patent
Bradburn

(10) Patent No.: US 7,487,997 B2
(45) Date of Patent: Feb. 10, 2009

(54) AIR-BAG

(75) Inventor: Alan Bradburn, Stoke on Trent (GB)

(73) Assignee: Autoliv Development AB, Vargarda (SE)

( * ) Notice: Subject to any disclaimer, the term of this patent is extended or adjusted under 35 U.S.C. 154(b) by 440 days.

(21) Appl. No.: 10/518,318

(22) PCT Filed: Jun. 5, 2003

(86) PCT No.: PCT/SE03/00932

§ 371 (c)(1), (2), (4) Date: Sep. 29, 2005

(87) PCT Pub. No.: WO03/106228

PCT Pub. Date: Dec. 24, 2003

(65) Prior Publication Data

US 2006/0232053 A1    Oct. 19, 2006

(30) Foreign Application Priority Data

Jun. 18, 2002    (GB) ................................. 0214004.4

(51) Int. Cl.
*B60R 21/237* (2006.01)
(52) U.S. Cl. .............................................. 280/743.1
(58) Field of Classification Search .............. 280/728.1, 280/743.1
See application file for complete search history.

(56) References Cited

U.S. PATENT DOCUMENTS

| | | | |
|---|---|---|---|
| 4,010,055 A * | 3/1977 | Oka et al. ..................... 156/226 |
| 5,316,337 A | 5/1994 | Yamaji et al. | |
| 5,536,043 A * | 7/1996 | Lang et al. ................... 280/753 |
| 5,607,182 A | 3/1997 | Nelsen et al. | |
| 5,697,640 A * | 12/1997 | Lalonde .................... 280/743.1 |
| 5,765,863 A | 6/1998 | Storey et al. | |
| 5,794,974 A * | 8/1998 | Niederman et al. ....... 280/743.1 |
| 5,855,393 A | 1/1999 | Keshavaraj | |
| 5,944,342 A | 8/1999 | White, Jr. et al. | |
| 5,957,486 A * | 9/1999 | Taguchi et al. .............. 280/729 |
| 6,382,662 B1 | 5/2002 | Igawa | |
| 6,666,477 B1 * | 12/2003 | Robertson et al. ......... 280/743.1 |
| 6,669,229 B2 * | 12/2003 | Thomas ....................... 280/732 |
| 7,371,445 B2 * | 5/2008 | Keshavaraj ................. 428/35.2 |

FOREIGN PATENT DOCUMENTS

| | | |
|---|---|---|
| DE | 44 30 221 C1 | 11/1995 |
| DE | 10246769 A1 | 4/2004 |
| EP | 0 553 542 A1 | 8/1993 |
| EP | 0955215 A2 | 11/1999 |
| JP | 5-77342 | 3/1993 |
| WO | WO 97/36770 | 10/1997 |
| WO | WO 03/078214 A1 | 9/2003 |

\* cited by examiner

*Primary Examiner*—Faye M. Fleming
*Assistant Examiner*—Laura Freedman
(74) *Attorney, Agent, or Firm*—Brinks Hofer Gilson & Lione

(57) ABSTRACT

An air-bag is formed from a single element of laminar material such as fabric. The element defines a rectangular region having linear side edges. This region has a shape and configuration equivalent to that of the air-bag when inflated. Each side edge of the region carries a protruding flap. There are infill elements between adjacent flaps. The flaps are inwardly folded to overlie the rectangular region. Each infill element lies between two respective inwardly folded adjacent flaps. The folded element may be secured to form an air-tight air-bag with reinforced corners.

11 Claims, 3 Drawing Sheets

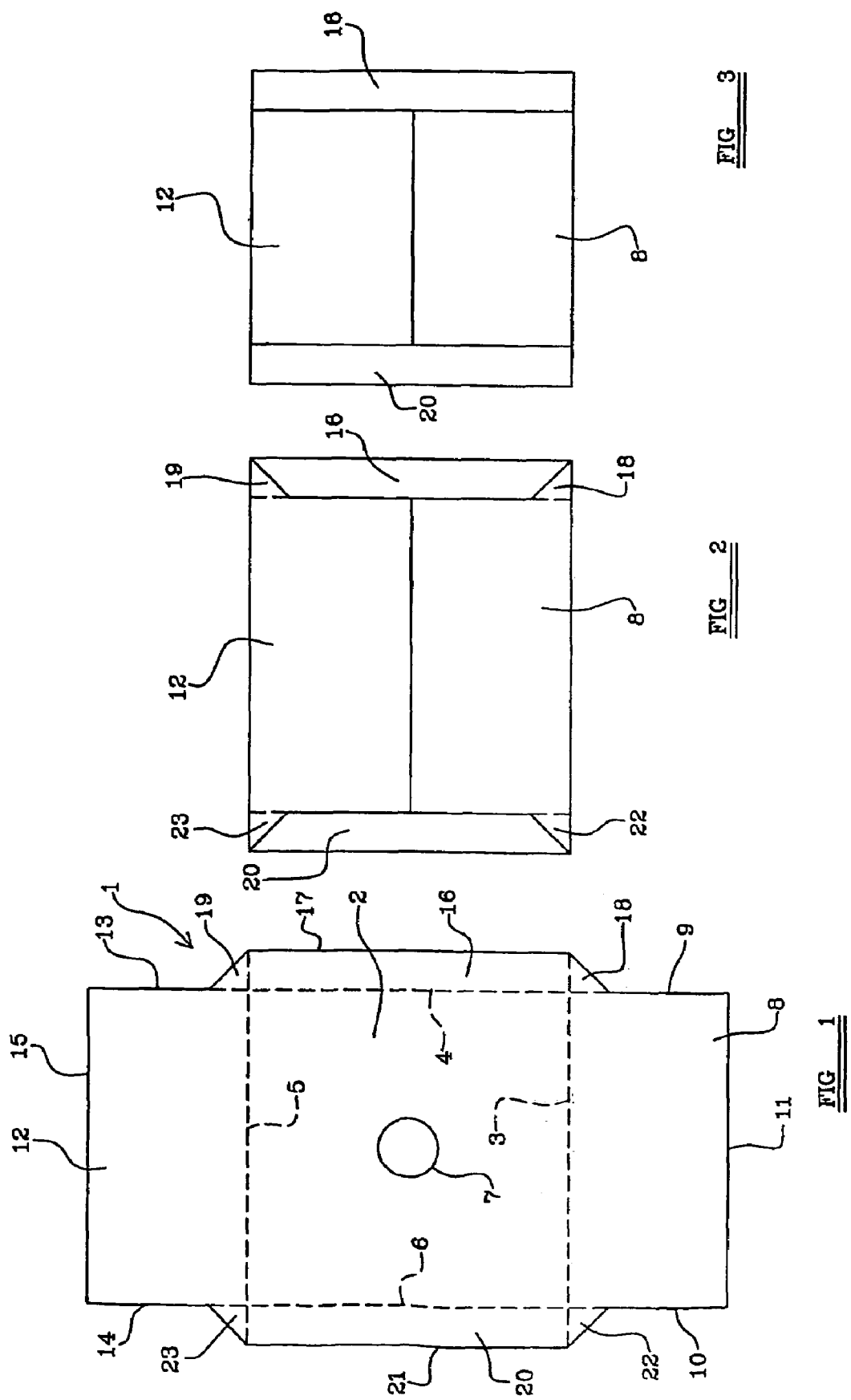

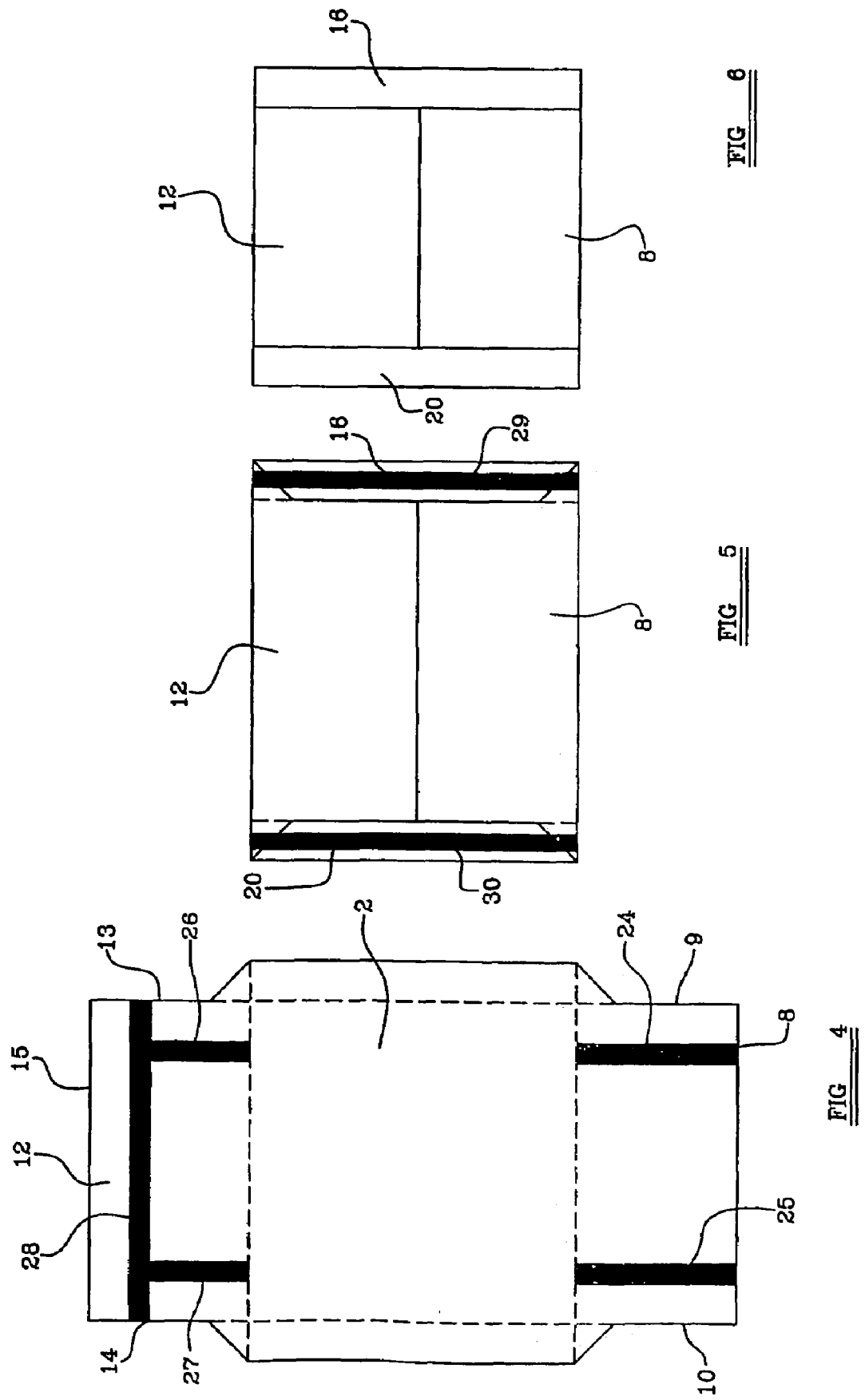

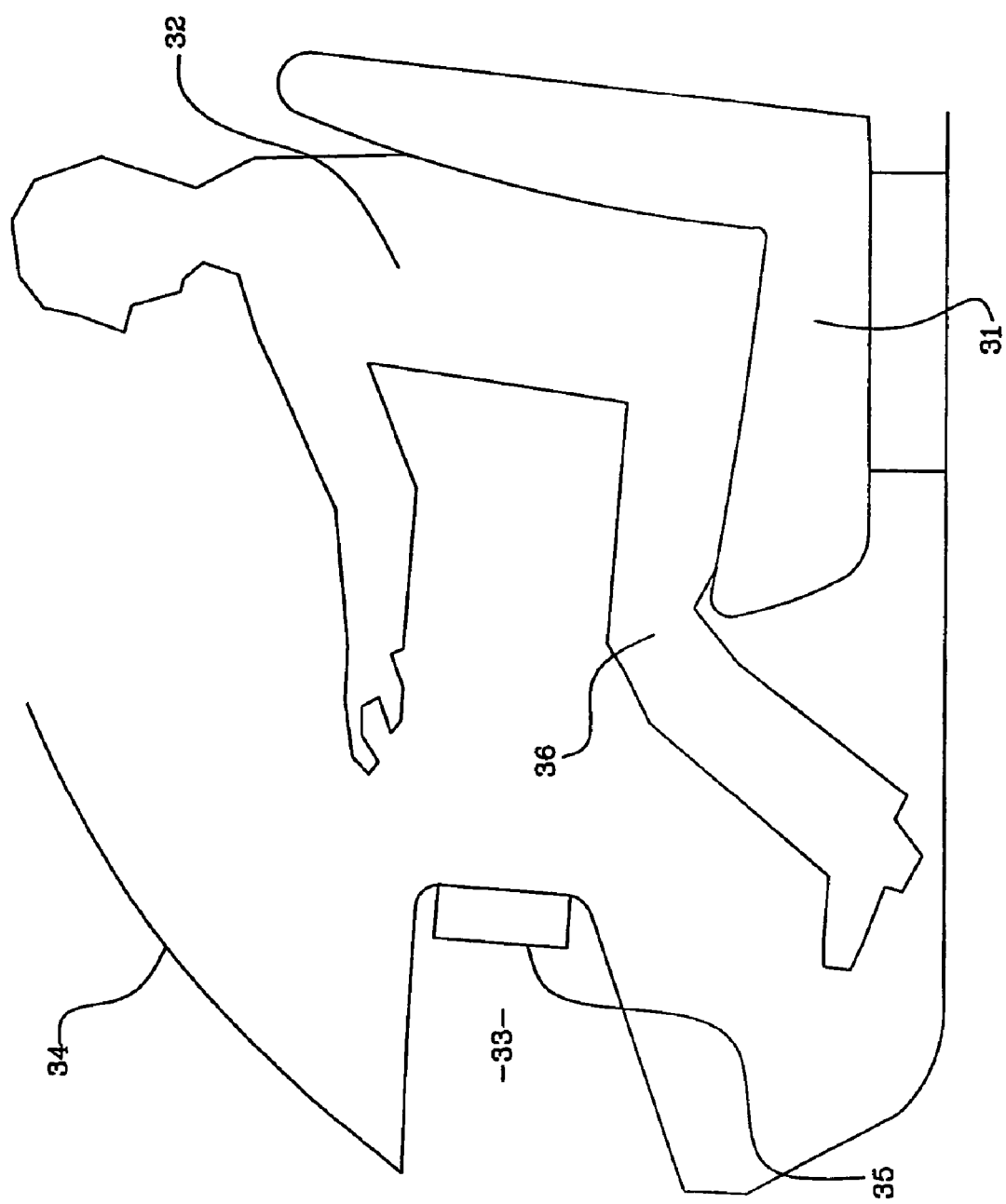

AIR-BAG

CROSS REFERENCE TO RELATED APPLICATION

This application claims priority to PCT/SE03/00932, filed Jun. 5, 2003, and GB 0214004.4, filed Jun. 18, 2002.

BACKGROUND OF THE INVENTION

The present invention relates to an air-bag, and more particularly relates to an air-bag adapted to be inflated to high pressure. The present invention also relates to a method of making an air-bag.

It has been proposed to provide air-bags in various locations within a motor vehicle. Each air-bag is adapted to be inflated in the event that an accident should occur to provide protection for an occupant of the vehicle. Some air-bags are subjected to extremely high forces during a collision, especially when the occupant of the vehicle strikes the air-bag with parts of their anatomy which present only a very small contact surface to the air-bag. For example, an air-bag which is located in a motor vehicle in front of the knees of the occupant, may be subjected to a very high force when an occupant moves forwardly relative to the air-bag and strikes the air-bag with their knees, due to the fact that knees are relatively "pointed", and thus only present a small area of contact with the air-bag. In such a situation there can be a tendency for the knees of the occupant to force the material or fabric at the front of the inflated air-bag towards the back of the airbag. Thus there is a risk that, in this way, the knees of the occupant will effectively pass right through the air-bag and engage with the structure on which the air-bag is mounted.

The risk of parts of an occupant passing "through" an inflated air-bag in this way is especially high if the air-bag is "flat", which means to say that the air-bag is of such a design that it does not have a substantial thickness, when inflated, as compared with its face area. Air-bags of this type may be considered to be "two-dimensional" as opposed to a more conventional substantially spherical air-bag which may be considered to be "three-dimensional".

It would be possible to minimise the risk of parts of an occupant of a vehicle extending "through" an air-bag by providing a substantially rigid load-distribution element on the front face of the air-bag. However, this expedient is relatively expensive. Also it would be possible to utilise a three-dimensional air-bag instead of a two-dimensional air-bag, but three-dimensional air-bags are more expensive to manufacture.

A further solution would be simply to utilise a two-dimensional air-bag which, when inflated, is inflated to a very high pressure. However, here the problem is faced that with a high pressure air-bag there is a substantial risk for gas leakage, especially in the corner region of the air-bag where it is difficult to effect a good seal. Thus gas may be concentrated or trapped in the corner areas, and may escape from the air-bag, especially during inflation of the air-bag.

The present invention seeks to provide an improved air-bag.

SUMMARY OF THE INVENTION

According to a first aspect of the present invention, there is provided an air-bag, the air-bag being formed from a single element of laminar material. The element defines a polygonal region having linear side edges, and having shape and configuration equivalent to that of the air-bag when inflated. Each side edge of the polygonal region carries a protruding flap, there being infill pieces defined between flaps protruding from adjacent the side edges. The flaps being inwardly folded to overlie the polygonal region and at least partially to overlie each other, each infill piece lying between two respective inwardly folded adjacent and the flaps being secured to form an air-tight air-bag.

Preferably, at least part of the element of fabric defines an aperture to receive a gas generator.

Advantageously, reinforcement is provided around the aperture.

Conveniently, the polygonal region has four linear edges.

Preferably, two opposed edges of the polygonal region each carry an opposed flap, each of the opposed flaps having side edges co-aligned with the other side edges of the polygonal region. The two opposed flaps having a combined area which is greater than the area of the said polygonal region.

Advantageously, said other side edges of the polygonal region each carry a respective flap of substantially rectangular form.

Conveniently, one of the two opposed flaps is provided with two strips of adhesive adjacent to the side edges thereof, that flap being first folded-in, and the other of the two opposed flaps are provided with adhesive adjacent to the side edges thereof and adjacent the free edge thereof. The second flap is folded-in, and the other flaps and the associated infill elements are provided with adhesive, those flaps being the last folded-in.

Preferably, each the infill element is of triangular form.

Advantageously, the flaps are secured by means of adhesive.

Conveniently, the air-bag takes the form of a new protection air-bag in a motor vehicle.

According to a second aspect of the second invention, there is provided a method of making an air-bag. The method comprising the steps of taking an element of laminar material, the element defining a square or rectangular region, two opposed side edges of the square or rectangular region carrying inwardly respective foldable first and second flaps, the inwardly foldable flaps having a combined area greater than the area of the square or rectangular region, two further opposed side edges of the square or rectangular region having further inwardly foldable flaps, and there being infill pieces between the side edges of each of the adjacent flaps. The method comprising the steps of applying adhesive to the first inwardly foldable flap adjacent two side edges of the first inwardly foldable flap, and folding that flap inwardly to overlie the square or rectangular region, applying adhesive to the second inwardly foldable flap adjacent two opposed side edges and the free edge of the second inwardly foldable flap, and folding the second inwardly foldable flap inwardly so that the adhesive secures the flap to part of the square or rectangular region and also part of the first inwardly folded flap, and finally applying adhesive to the further inwardly foldable flaps and the infill pieces, and folding the further inwardly foldable flaps and infill pieces inwardly.

BRIEF DESCRIPTION OF THE DRAWINGS

In order that the invention may be more readily understood, and so that further features thereof may be appreciated, embodiments of the invention will now be described, by way of example, with reference to the accompanying drawings in which:

FIG. 1 is a view illustrating a single piece of fabric from which an air-bag in accordance with the present invention is to be made, the fabric being shown in an initial or unfolded condition, FIG. 2 is a view corresponding to FIG. 1 showing the fabric after the first folding steps have been completed, FIG. 3 is a view corresponding to FIG. 2 showing the fabric after all of the relevant folding steps have been completed, so that the fabric is in the form of a complete air-bag, FIG. 4 is a view corresponding to FIG. 1 showing adhesive applied to the air-bag, FIG. 5 is a view corresponding to FIG. 2 showing adhesive applied to the air-bag, FIG. 6 is a view corresponding to FIG. 3 showing a completed air-bag formed using adhesive, and FIG. 7 is a view illustrating an air-bag in accordance with the invention in position within a motor vehicle.

DETAILED DESCRIPTION OF THE INVENTION

Referring initially to FIGS. 1 to 3 of the accompanying drawings, a method of forming an air-bag from a single element of fabric will now be described.

FIG. 1 illustrates an element 1 of laminar material in the form of fabric that is to be utilised to form an air-bag. Other laminar materials such as films or sheets of, for example, plastics materials may be used in other embodiments of the invention. The element 1 has a central polygonal region 2 which, in the illustrated embodiment, is rectangular. The polygonal region 2 has four side edges 3, 4, 5, 6, and also has a central circular aperture 7 formed therein.

A rectangular lower flap 8 extends from the lower-most side edge 3. Lower flap 8 has two opposed side edges 9, 10 which are co-aligned with two opposed side edges 4, 6 of the rectangular region 2. The lower flap 8 has a lower-most edge 11 which is parallel with the edge 3 of the rectangular region 2 to which the lower flap 8 is connected. Flaps are provided which protrude outwardly from each of the side edges 3, 4, 5, 6 of the rectangular region 2.

The upper side edge 5 of the rectangular region 2 carries an upper protruding flap 12 which is also of rectangular form. The upper flap 12 has opposed side edges 13, 14 which are co-aligned with opposed side edges 4, 6 of the rectangular region 2. The upper flap 12 has an upper edge 15 which is parallel with the edge 5 of the rectangular region 2 to which the upper flap 12 is connected.

The lower and upper flaps 8, 12 are of a substantial size, with the upper flap 12 being slightly larger than the lower flap 8. The combined area of the lower flap 8 and the upper flap 12 is slightly greater than the area of the rectangular region 2.

The right-hand side 4 of the rectangular region 2 carries a protruding side flap 16, which is of lesser extent than the lower and upper flaps 8,12. The side flap 16 has a free edge 17 which is parallel with and spaced from the side edge 4 of the rectangular region 2 to which the side flap 16 is connected. The free edge 17 of the side flap 16 has the same length as the side edge 4 of the rectangular region, and thus the side flap 16 may be considered to have a main rectangular portion.

The edge of the element 1 at each end of the free edge 17 of the side flap 16 extends at an angle of approximately 45° to the free edge 17, towards the adjacent side edge 9, 13 of the lower flap 8 and upper flap 12 respectively, thus forming triangular-shaped infill elements 18, 19 between the main rectangular portion of the side flap 16 and the adjacent lower and upper flaps 8, 12.

The left-hand side edge 6 of the rectangular region 2 carries a side flap 20 which is effectively identical to the side flap 16 provided at the right-hand side. The side flap 20 has a free edge 21 which extends parallel with the left-hand side edge 6 of the rectangular region 2, the free edge 21 of the side flap 20 having the same length as the side edge 6 of the rectangular region 2. The side flap 20 has a rectangular portion which is associated with triangular infill elements 22, 23 located between the rectangular region of the side flap 20 and the adjacent lower and upper flaps 8, 12.

When assembling an air-bag from the element 1, as shown in FIG. 1, initially the lower flap 8 is folded upwardly about the lower edge 3 of the rectangular region 2 so that the lower flap 8 overlies the rectangular region 2. As the lower flap 8 is folded up, so the associated triangular infill elements 18, 22, which are effectively connected to the lower flap 8, are also folded up, to overlie the rectangular portion of the two respective side flaps 16, 20.

Subsequently, the upper flap 12 is folded downwardly about the upper edge 5 of the rectangular central region 2 so that the upper flap 12 overlies the rectangular region 2. As the upper flap 12 is folded downwardly, the associated infill elements 19, 23, which are connected to the upper flap 12 will also be folded downwardly, to overlie the rectangular portion of the two respective side flaps 16, 20.

Because the combined area of the lower flap 8 and the upper flap 12 is greater than the area of the rectangular region 2, and the upper flap 12 is larger than the lower flap 8, the upper flap 12 will overlie not only part of the rectangular region 2, but also a portion of the lower flap 8.

After the above-described folding steps, the element 1 has the form shown in FIG. 2.

Finally, the right-hand side flap 16 and the left-hand side flap 20 are each folded inwardly. As the right-hand side flap 16 is folded inwardly, about the left-hand side edge 4 of the rectangular region 2, the triangular infill elements 18, 19 overlying the rectangular portion of the side flap 16 are also folded inwardly so that the infill elements 18, 19 immediately overlie the folded-in lower and upper flaps 8, 12. Similarly, as the left-hand side flap 20 is folded-in, the infill elements 22, 23 overlying the rectangular portion of the side flap 20 are folded inwardly, and also overlie the flaps 8, 12. The infill elements 18,19,22,23 each lie between two respective inwardly folded adjacent flaps and thus substantially reinforce the respective corners of the air-bag which has thus been formed.

It is to be appreciated that in the above description, only the folding steps that are applied to the element 1 have been described. Of course, parts of the element 1 will need to be secured to adjacent parts by the use of adhesive, stitching or some form of welding, to form a practicable air-bag.

A gas generator may be connected to the air-bag by means of the circular aperture 7.

FIGS. 4 to 6 correspond with FIGS. 1 to 3, but illustrate how adhesive may be applied to the element 1 during the folding process, so that the adhesive will secure adjacent elements of the fabric together.

As shown in FIG. 4, the lower flap 8 may be provided with two strips of an adhesive 24 and 25, the strips extending adjacent to and parallel with two opposed side edges 9,10 of the lower flap 8. Thus a first strip of the adhesive 24 is provided adjacent the right-hand side edge 9, and a second strip of adhesive 25 is provided adjacent the left-hand side edge 10.

The upper flap 12 is provided with three strips of adhesive 26, 27, and 28, two strips 26 and 27 being adjacent the two side edges 13, 14 respectively, and a third strip 28 being adjacent the free edge 15. Thus, a first strip of adhesive 26 is provided adjacent the right-hand side edge 13, a second strip of adhesive 27 is provided adjacent the left-hand side edge 14, and a third strip of adhesive 28 is provided adjacent the free edge 15. The third strip of adhesive 28 applied to the upper flap 12 actually establishes contact with the ends of the first and second strips 26 and 27, and extends completely from the right-hand side edge 13 to the left-hand side edge 14.

It is to be appreciated that as the lower flap 8 is initially folded up, the adhesive strips 24, 25 applied thereto will serve to adhere the lower flap 8 to the rectangular region 2 of the fabric element 1, and when the upper flap 12 is folded down, the first and second strips of adhesive 26, 27 will secure the upper flap 12 to the rectangular region 2, whilst the third adhesive strip 28 will secure the upper flap 12 to part of the lower flap 8.

When the lower and upper flaps 8, 12 have been folded-in, as described above, further adhesive is applied to the part folded element in the form of two parallel strips, each strip overlying one of the side flaps 16, 20. Thus, as can be seen in FIG. 5, a first adhesive strip 29 is provided which extends over the right-hand side flap 16, and also over the then exposed parts of the associated infill elements 18, 19. Similarly, a second adhesive strip 30 extends across the left-hand flap 20 and the exposed parts of the associated infill elements 22, 23.

When the side flaps 16, 20 are folded-in, the adhesive strips 29,30 applied thereto serve to adhere the inwardly folded side flaps 16, 20, and also the inwardly folded infill elements 18, 19, 22, 23 to the exposed upper surfaces of the lower flap 8 and the upper flap 12.

FIG. 7 illustrates part of a motor vehicle showing schematically a seat 31 for supporting an occupant 32. Located in front of the seat is a dashboard 33 and a windscreen 34. An air-bag 35 is mounted within the dashboard 33 and configured to be inflated in the event that an accident should occur, in order to provide protection for the knees 36 of the occupant 32. The air-bag 35 maybe an air-bag of the type described above.

Whilst, in the embodiments specifically described above, the air-bag has a main rectangular region 2 so that the air-bag, when inflated, is a two-dimensional air-bag of rectangular form (the configuration of the air-bag corresponding with the configuration of the main rectangular region), it is to be appreciated that an air-bag in accordance with the invention may have other shapes. Thus the air-bag, and the main region of the air-bag may be square or hexagonal shape, or of any other convenient polygonal form. In each case, each side of the main polygonal region of the element from which the air-bag is made will carry an outwardly directed flap which is to be folded-in, with infill elements being defined between the adjacent flaps.

Whilst the gas inlet aperture 7 has been shown as being in the main rectangular region 2, the gas aperture 7 may be provided in any of the flaps which are to be folded-in.

Reinforcing elements may be provided. For example, a reinforcing element may surround the aperture 7 formed in the element 1 for receipt of the gas generator, or reinforcing elements may be provided in the corner regions of the air-bag.

It is to be appreciated that because the corners of the air-bag are relatively strong and gas-tight, due to the presence of the infill elements, the air-bag may be inflated to a very high pressure, and thus the risk of a part of a vehicle occupant, which only presents a low surface area, contacting and passing "through" the air-bag is minimised or obviated.

While the above description constitutes the preferred embodiment of the present invention, it will be appreciated that the invention is susceptible to modification, variation and change without departing from the proper scope and fair meaning of the accompanying claims.

The invention claimed is:

1. An air-bag being formed from an element of laminar material, the element of laminar material defining a central polygonal region having at least four side edges, and the element of laminar material having a shape and configuration equivalent to that of the air-bag when inflated, the side edges of the central polygonal region each carrying a protruding flap to define a plurality of protruding flaps including an upper flap and a lower flap and at least two side flaps, the upper and lower flaps having a combined area which is greater than an area of the central polygonal region, there being at least one infill element defined between at least one of the side flaps and at least one of the upper and lower flaps, the side flaps and the upper and lower flaps being inwardly folded to overlie the central polygonal region and to at least partially overlie each other, the infill element lying between two respective inwardly folded adjacent flaps defined by one of the side flaps and one of the upper and lower flaps, the protruding flaps being secured to form the air-bag.

2. An air-bag according to claim 1 wherein at least part of the element of laminar material defines an aperture to receive a gas generator.

3. An air-bag according to claim 2 wherein a reinforcement is provided around the aperture.

4. An air-bag according to claim 1 wherein the polygonal region has four of the side edges which are generally linear.

5. An air-bag according to claim 4 wherein two opposed edges of the central polygonal region carry the upper and lower flaps, each of the upper and lower flaps having side edges co-aligned with the side edges of the central polygonal.

6. An air-bag according to claim 5 wherein the side edges of the central polygonal region each carry a respective one of the side flaps, the side flaps of substantially rectangular form.

7. An air-bag according to claim 6 wherein one of the upper and lower flaps is provided with at least two of first strips of adhesive adjacent the side edges thereof, one of the upper or the lower flaps being first folded-in; and the other of the upper and the lower flaps is provided with one or more second strips of adhesive adjacent the side edges thereof and adjacent a free edge thereof, and the side flaps and the associated infill element are provided with one or more third strips of adhesive.

8. An air-bag according to claim 1 wherein the at least one infill element is of triangular form.

9. An air-bag according to claim 1 wherein the upper and lower flaps and the side flaps are secured by means of adhesive.

10. An air-bag according to claim 1 in the form of a knee protection air-bag in a motor vehicle.

11. A method of making an air-bag, the method comprising the steps of taking an element of laminar material, the element defining a square or rectangular central region, two opposed side edges of the central region carrying inwardly respective foldable first and second flaps, the first and second inwardly foldable flaps having a combined area greater than the area of the central region, two further opposed side edges of the central region having further inwardly foldable side flaps, there being a corresponding infill element between each of the adjacent flaps to define a plurality of infill elements, applying adhesive to the first inwardly foldable flap adjacent two side edges of the first inwardly foldable flap, and folding the first flap inwardly to overlie the central region, applying adhesive to the second inwardly foldable flap adjacent two opposed side edges and a free edge of the second inwardly foldable flap, and folding the second inwardly foldable flap inwardly so that the adhesive secures the second flap to part of the central region and also part of the first inwardly folded flap, and applying adhesive to the further inwardly foldable side flaps and the infill elements, and folding the side flaps and infill elements inwardly to overly the central region.

* * * * *

UNITED STATES PATENT AND TRADEMARK OFFICE
CERTIFICATE OF CORRECTION

PATENT NO. : 7,487,997 B2  Page 1 of 1
APPLICATION NO. : 10/518318
DATED : February 10, 2009
INVENTOR(S) : Alan Bradburn It is certified that error appears in the above-identified patent and that said Letters Patent is hereby corrected as shown below:

On the Title Page

Under "Inventor": delete "Stoke on Trent" and insert --Staffordshire--.

Signed and Sealed this

Second Day of June, 2009

JOHN DOLL
*Acting Director of the United States Patent and Trademark Office*